March 30, 1937.  T. L. HEDGPETH  2,075,282
BENCH SAW
Filed May 27, 1935  4 Sheets-Sheet 1

Inventor:
Theron L. Hedgpeth
By Williams, Bradbury, McCaleb & Hinkle
Attys.

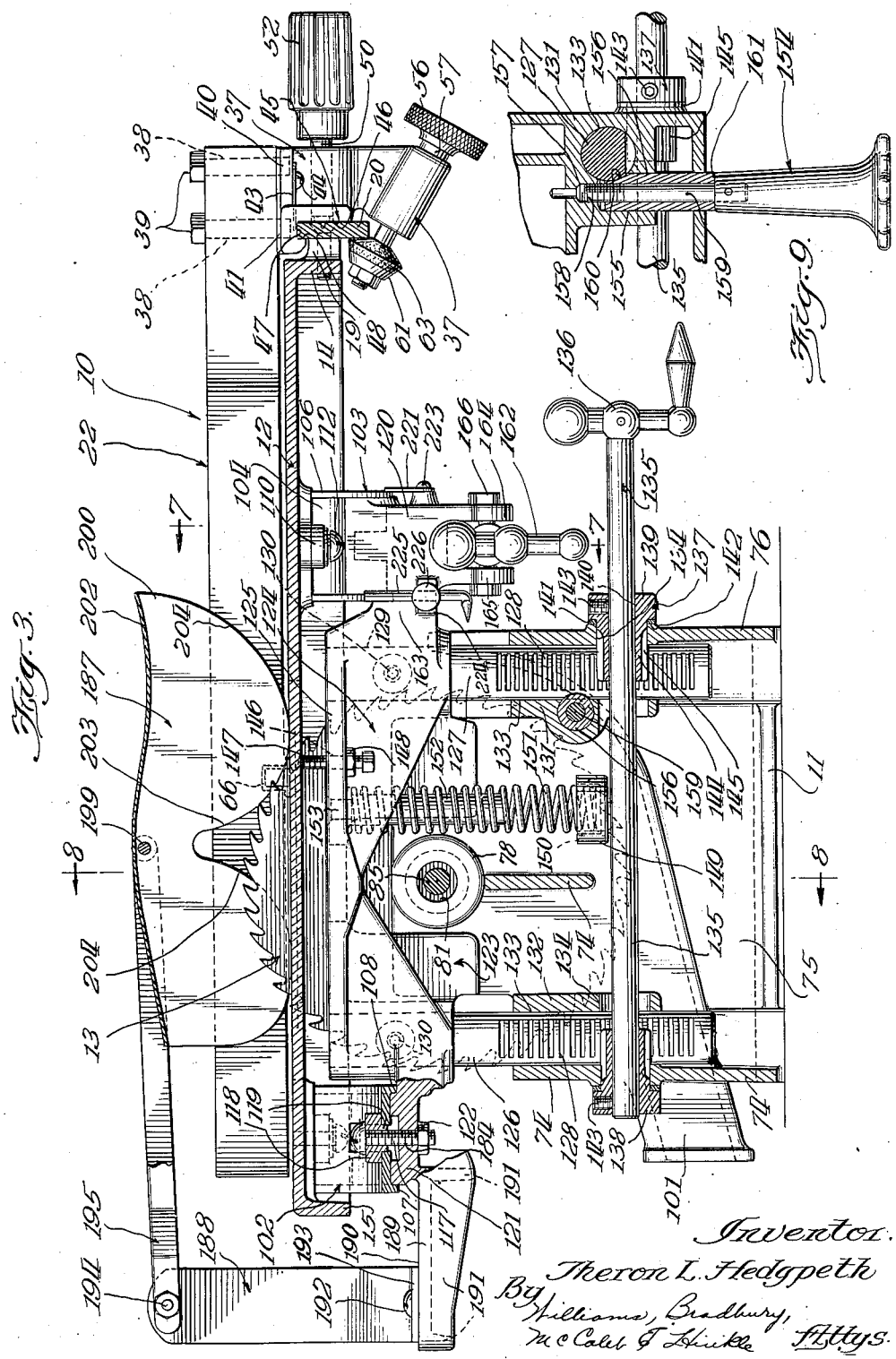

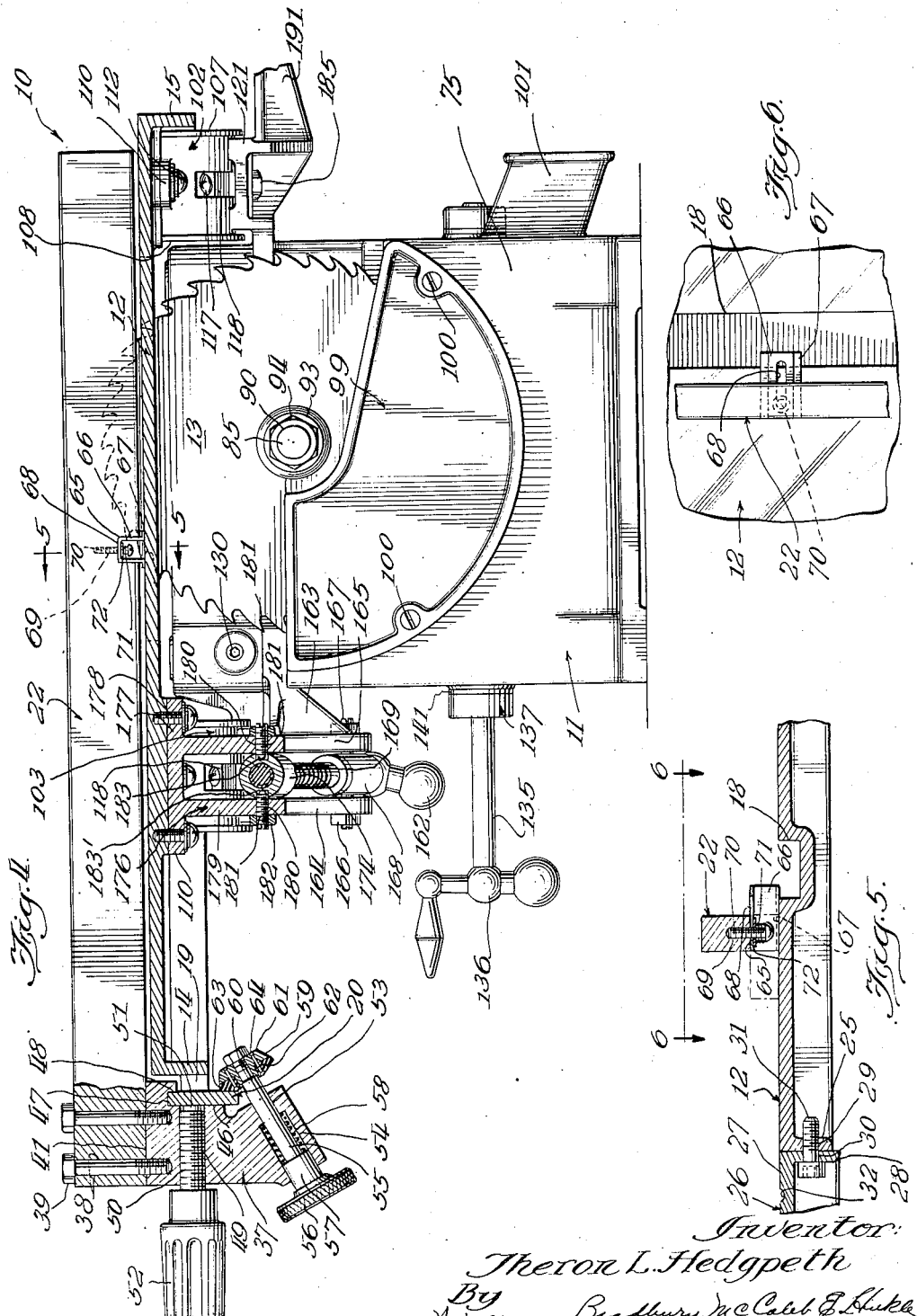

March 30, 1937.  T. L. HEDGPETH  2,075,282
BENCH SAW
Filed May 27, 1935  4 Sheets-Sheet 4
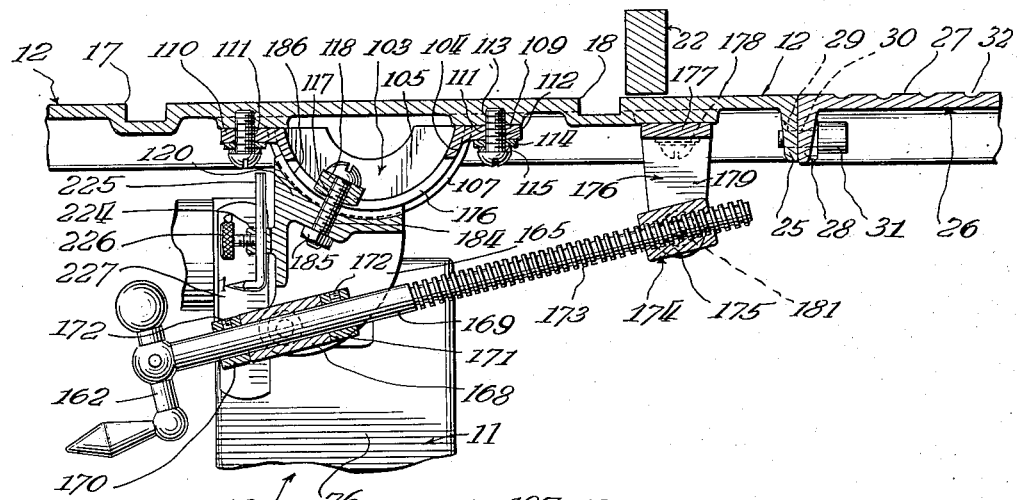
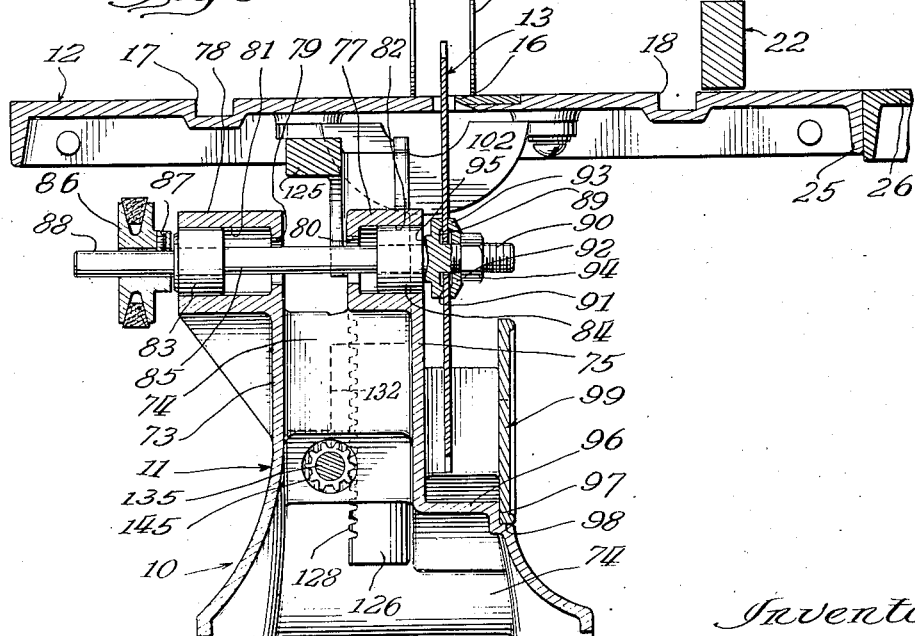
Inventor
Theron L. Hedgpeth
By Williams, Bradbury, McCaleb & Hinkle
Attys.

Patented Mar. 30, 1937

2,075,282

UNITED STATES PATENT OFFICE 2,075,282

BENCH SAW

Theron L. Hedgpeth, Oak Park, Ill., assignor to Duro Metal Products Company, Chicago, Ill., a corporation of Illinois Application May 27, 1935, Serial No. 23,541

10 Claims. (Cl. 143—174)

The present invention relates to bench saws, and is particularly concerned with bench saws of the type used in wood working and driven by some source of motive power, such as an electric motor.

One of the advantages of the invention is the provision of an improved power driven bench saw of the type having a circular saw having all of the necessary features of the more expensive devices, which, however, has been so simplified and re-arranged that the device may be constructed at a very low cost and thus placed within the means of a vast number of purchasers who may desire saws of this type either for home work or for commercial wood working operations.

Another object of the invention is the provision of an improved construction including a tilting mechanism for the bench saw table, by means of which the table may be angularly adjusted to a fraction of a degree and held in place by means of the tilting mechanism without the necessity for any additional securing or clamping devices.

Another object of the invention is the provision of an improved rip fence and gauge construction for bench saws of the class described, which has been greatly simplified over the devices of the prior art in so far as holding devices and guides are concerned, but which is adapted to guide the work in perfect alignment with the saw and may be quickly and conveniently moved from one place to another and held in place without any possibility of misalignment.

Other objects and advantages of the invention will be apparent from the following description and the accompanying drawings, in which similar characters of reference indicate similar parts throughout the several views.

Referring to the four sheets of drawings accompanying this specification:

Fig. 3 is a vertical sectional view taken on the plane of the line 3—3 of Fig. 1, looking in the direction of the arrows and showing the details of construction of the arrangement for raising and lowering the table;

Fig. 4 is a vertical elevational view in partial section, taken on the plane of the line 4—4 of Fig. 2;

Fig. 5 is a fragmentary sectional view taken on the plane of the line 5—5 of Fig. 4, showing the details of construction of the arrangement for causing the rip fence to bridge the miter gauge grooves;

Fig. 6 is a fragmentary top plan view of the device for bridging the miter gauge grooves;

Fig. 7 is a fragmentary sectional view showing the tilting arrangement for the table, taken on the plane of the line 7—7 of Fig. 3, looking in the direction of the arrows;

Fig. 8 is a fragmentary sectional view taken on the plane of the line 8—8 of Fig. 3, showing the further details of construction of the table and the drive shaft for the saw; and Fig. 9 is a fragmentary sectional view taken on the plane of the line 9—9 of Fig. 2, looking in the direction of the arrows, and illustrating the clamping arrangement for holding the table at predetermined elevation.

Figures 1, 2:
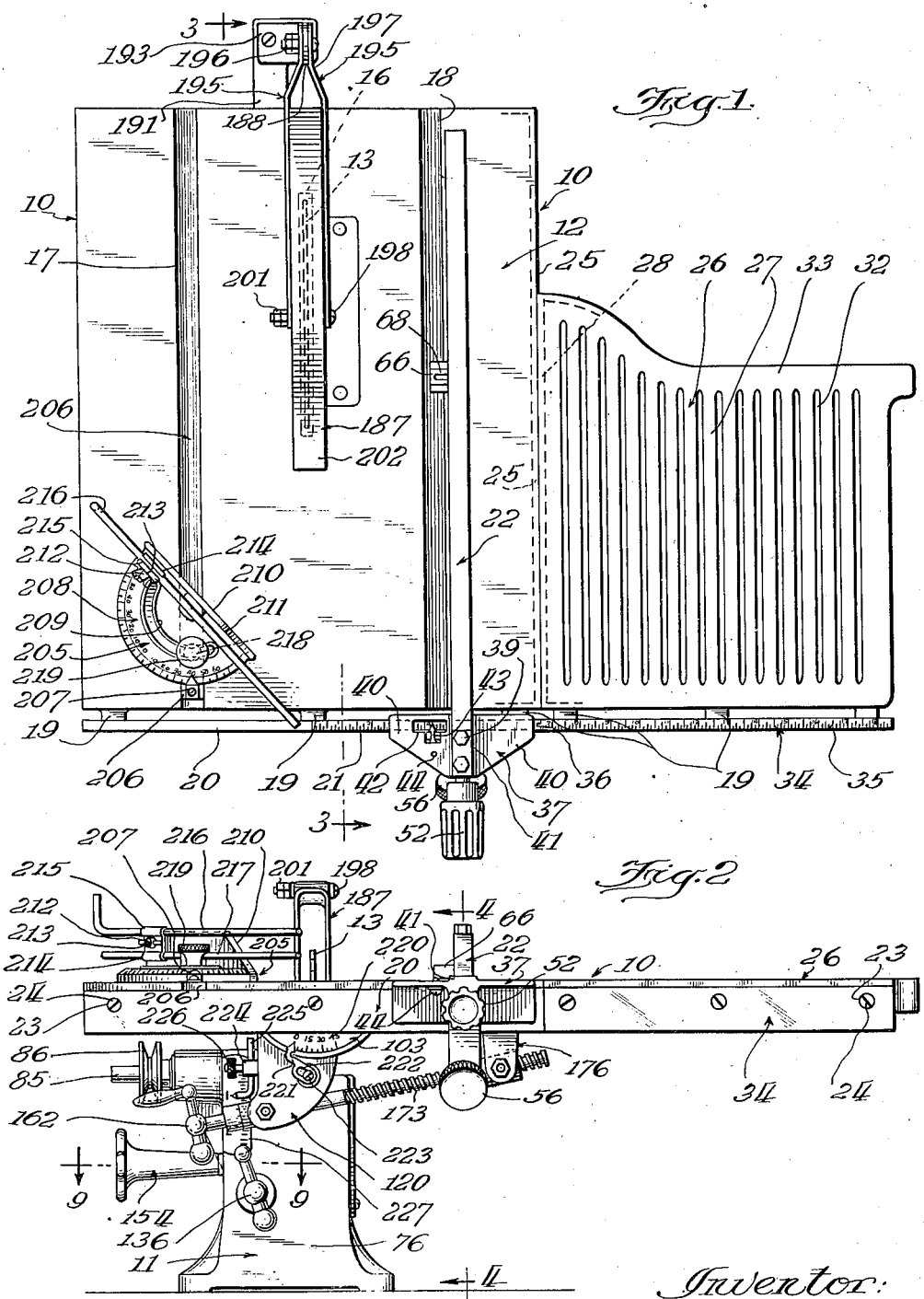
Fig. 1 is a top plan view of a bench saw constructed according to the present invention and including a table extension for the handling of unusually wide work stock.
Fig. 2 is a front elevation of the table of Fig. 1.

Referring to Figs. 1 to 3, 10 indicates in its entirety the complete bench saw, which is preferably provided with a base 11 for supporting a table 12 and a saw blade 13 of the circular type. The table 12 consists of a plane metal member which has its top machined to an accurately plane surface and which is preferably provided with a plurality of depending flanges or reinforcing ribs 14, 15 for the purpose of providing border flanges and reinforcing the table.

The table 12 is also provided with a centrally located aperture 16, preferably substantially rectangular in plan, for the purpose of accommodating the saw blade 13. The slot 16 is of sufficient size to accommodate the largest saw blade which can be used with a table of this type with adequate clearance on all sides of the blade.

The table 12 is also provided with a pair of longitudinally extending slots 17, 18 for the purpose of supporting a miter gauge. The slots 17, 18 may either be dovetailed in vertical section or accurately rectangular, depending on whether it is desired to hold the miter gauge in the slot against removal vertically or whether it is desired to place the miter gauge in the slot at any point.

Of course, if the slots are dovetailed, the miter gauge has its supporting bar of complementary section and must be inserted from the end. The table 12 is also provided with a plurality of forwardly extending reinforcing and supporting lugs 19, carried by the front border flange 14, to provide sufficient material for securement of a guide bar 20.

The guide bar 20, which preferably extends only from one edge of the table 12 to the opposite edge, and which is coextensive in length with the width of the table, comprises a substantially rectangular bar of metal such as steel, which may be provided with graduated indicia 21 at the top, comprising scale divisions and numbers indicating units of length such as inches or centimeters. The scale preferably begins at a point which is in the plane of the right hand edge or face of the saw blade 13; that is, the scale 21 would then indicate the width of a piece of lumber after it had been ripped or sawed in accordance with the location of the rip fence 22, located by means of the indicia 21.

The guide bar 20 is provided with a suitable aperture 23 in alignment with a threaded bore in each of the lugs 19, and may be secured to the table by screw bolts 24 extending through the bar and threaded into the lugs 19.

The outer surfaces of the lugs 19 which engage the bar 20 are accurately machined to a plane which is at right angles to the plane of the saw 13 so that the guide bar 20 may accurately hold the rip fence 22 parallel to the plane of the saw blade 13.

The table 12 is also preferably provided with a depending border flange 25 at its right side for purposes of reinforcement and for use in securing a table extension, which is indicated in its entirety by the numeral 26.

The table extension 26 is intended to permit the use of the bench saw with its rip fence for ripping wider boards than could be accommodated by the table 12. The extension table 26 may comprise a flat metal member formed with an upper plane machined surface 27 and with the depending border flange 28, which may also be used for attaching the extension 26 to the table 12. For example, in Fig. 6, it will be noted that the flange 26 on table 12 is provided with a threaded aperture 29 for receiving the threaded screw bolts 31 which extend through the apertures 30 in the flange 28 and secure the extension 26 to the table 12. Of course, these apertures are so arranged that the upper plane surface of the extension 26 becomes a continuation of the upper plane surface of the table 12, being located in the same plane.

The extension 26 may also be provided with a plurality of longitudinally extending grooves 32 which serve to reduce the weight of the extension and save material without affecting the efficiency of the arrangement. The grooves 32 do not extend to the rear edge of the table extension 26, leaving the flat plane surface 33 at the rear edge for supporting the rip fence 22 and permitting it to bridge the grooves 32 without any possibility of obstruction.

Like the table 12, the table extension 26 is provided with a plurality of forwardly extending lugs 19 having threaded bores and having flat machined surfaces at their outer ends for supporting the extension guide bar 34.

The extension guide bar 34 is provided with indicia 35, which begin at the end of the indicia 21 of the guide bar 20 and continue upward in the higher numbers of units of length. The guide bar 34 is also provided with similar apertures 23 for receiving screw bolts 24 which are threaded into the bores of the lugs 19 to secure the extension bar 34 to the extension table 26. In order to assure the accurate alignment of the adjacent ends of the guide bars 20 and 34, where they abut at the edge of the table 12, these ends of the guide bars may be formed with complementary tongue and groove formations, indicated at 36.

In other embodiments of the invention the securing devices may be arranged with such accuracy that the guide bars 20 and 34 are accurately aligned, but if the tongue and groove or other aligning formations 36 are provided it is not necessary to so accurately align the holes on the securing bolts 31 which secure the table extension 26 to table 12.

The rip fence 22 preferably comprises a metal bar of steel or other suitable material, which is accurately machined to be substantially rectangular in vertical cross section, and which is of sufficient length to extend longitudinally across the table 12 when affixed to the fence supporting fixture 37 which supports and guides the rip fence bar 22. For this purpose the rip fence is provided with a pair of vertically extending apertures or bores 38 for receiving the screw bolts 39 which pass through the rip fence and are threaded into the threaded bores provided in the fixture 37.

The fixture 37 comprises a cast metal member which is formed on its upper side with a flat triangular flange 40, a portion 41 of which, underneath the rip fence 22, is accurately machined so as to hold the rip fence 22 in accurate parallelism with the saw blade 13 and to hold the lower face of the rip fence 22 at or just above the plane of the table 12.

The flange 40 is provided with an aperture 42 at one side above the guide bar indicia 21, 34, and the aperture 42 is of sufficient size so as to permit a view of a pointer 43 which is carried by the lower side of flange 40. Pointer 43 may be secured by means of a rivet 44 which passes through the pointer and the flange 40, and the end of the pointer 43 is arranged in the substantially T-shaped aperture 42 in such manner that the point is directly above the indicia 21. Pointer 43 is so arranged that it indicates the distance between the left face of the rip fence 22 and the right face of the saw blade or saw blade teeth so that the indicia 21 will indicate the width of a board sawed with the rip fence in the position indicated.

The supporting fixture 37 is provided with a partially rectangular guide member 45 upon its rear side, which may consist of the flat vertical surface 46, the upper flat surface 47, and the flat rear surface 48, these surfaces being so arranged that they are substantially complementary to a portion of the surface of the guide bar 20.

The guide 45 is in vertical section and elevation substantially hooked shaped and partially rectangular so that it hooks over the bar 20, and is adapted to slidably engage the bar. The surfaces 46—48 are of sufficient length transversely of the rip fence so as to accurately hold the rip fence at right angles to the bar 20, engaging the bar as shown in section in Fig. 4. The fixture may also be provided with a horizontally extending threaded bore 49 which is in substantial alignment with the guide bar 20 so that the threaded clamping member 50, which has its reduced cylindrical end 51 engaging the bar 20, in Fig. 4, can be brought into clamping engagement with the bar 20 to hold the rip fence in any predetermined position.

Threaded clamping member 50 is provided with a hand knob 52 of any suitable shape. The fixture 37 also extends downward below the guide bar 20 and is provided with a diagonally upwardly extending bore 53 and counterbore 54. The bore 53 rotatably receives a cylindrical shaft 55, which carries at its outer end a hand knob 56 having a cylindrical hub 57 which is rotatably engaged in the counterbore 54. The counterbore 54 also contains a helical coil spring 58 which is preferably of sufficient strength so as to maintain the parts of the mechanism in the position of Fig. 4 at all times; that is, the drive wheel 59 carried by the inner end of shaft 55 cannot be conveniently disengaged from the bar 20 by pushing on the knob 56 because the spring 58 is so strong as to maintain these parts in constant engagement.

The shaft 55 is provided with a reduced threaded portion 60, upon which is mounted a small drive wheel 61, having a hub 62. The hub 62 and drive wheel 61 are arranged to support a frustoconical rubber disc 63 which is secured to the drive wheel 61 by means of rivets or pins 64, and the rubber disc 63 provides a non-slipping engagement between the guide bar 20 and drive wheel 61. When the knob 56 is rotated, the drive wheel 61 with its rubber engaging surface 63 engages the bar 20 and causes the fixture 37 and rip fence to progress from right to left, or vice versa. Right hand motion is accomplished by turning the knob 56 counterclockwise, while left hand motion of the rip fence is accomplished by turning the knob 56 in a clockwise direction.

The rip fence 22 may be made of sufficient width in some embodiments to bridge the miter gauge grooves 17. I prefer, however, to make the rip fence 22 narrower in a horizontal plane and provide my rip fence with a means for bridging the miter gauge slots 17 as follows:

Referring to Fig. 4, the rip fence is provided with a transversely extending slot 65 located adjacent the rear end of the rip fence or at a point spaced from the fixture 37.

The slot 65 may be substantially rectangular in vertical section and is adapted to slidably engage a substantially U-shaped stirrup 66, which fits in the slot and is provided with a pair of foot flanges 67. The arrangement between the stirrup 66 and rip fence 22 with respect to the fixture 37 is such that the rip fence is held in substantially parallel position with respect to the top of the table 12 and may slide on the table, being supported at its rear end by the foot flanges 67.

The bridging stirrup 66 is longer than the thickness of the rip fence 22, as shown in Fig. 1, where it projects at the left side, and by virtue of its length it is adapted to bridge the miter gauge slots 17; 18 and support the rip fence 22 as it slides over one of these slots.

In order to secure the bridging stirrup 66 in place, I provide it with a slot 68 located in its yoke, and I provide the rip fence 22 with a vertically extending threaded bore 69. A screw bolt 70 passes through a helical compression spring 71, through the washer 72 and through the slot 68 being threaded into the bore 69. The spring 71 thus engages the head of the bolt 70 and the yoke 68 of the stirrup 66 and draws the bridging stirrup 66 into the slot 65 at all times. The stirrup 66 may, however, be slid over to the right or the left side of the rip fence 22 so as not to interfere with the functions of the rip fence or obstruct in any way the work piece. The bridging stirrup 66 is adapted to cause the end of the rip fence 22 to clear the miter gauge slots 17, 18 without any possibility of the rip fence being obstructed or sticking at said slots during its progress across the table 12.

Referring to Fig. 8, the base 11 preferably comprises a cast metal member which is generally hollow and is formed with the four side walls 73, 74, 75 and 76. The upper part of the base 11 is formed with a pair of integral cylindrical bosses 77, 78, each of which is provided with a bore 79, 80 and with a counterbore 81, 82. The counterbores are adapted to receive the anti-friction bearings 83, 84, which may consist of any ball bearings having a pair of races, inner and outer, and the usual balls and ball retainers, but I prefer to use self-aligning ball bearings. The outer races of the ball bearings 83, 84 are preferably a close frictional fit in the counterbores 81, 82, and these counterbores and races may be suitably tapered to fix the outer races firmly in the counterbores.

The inner races of the ball bearings 83, 84 are secured to a shaft 85, the outer end of which is provided with a drive pulley 86, preferably of the V type, which may be secured to the shaft by a set screw 87 engaging in a key way 88, or by any other suitable securing means.

The opposite end of the shaft 85 is provided with a radially projecting flange 89 and a threaded end 90. The flange 89 has a longitudinally projecting annular flange 91 for engaging the saw blade 13, and the shaft is provided with a clamping member 92 which may consist of an apertured disc, preferably provided with an axially extending annular flange 93 for engaging the saw blade 13. The clamping member 92 may be threaded on the threaded end 90 and secured in place by means of the lock nut 94, or the clamping member may be unthreaded and a pair of lock nuts utilized. The edges of the clamping flanges 84, 93 are accurately machined so that the blade 13 is held at exactly right angles to the axis of the shaft 85.

The annular surface 95 behind the clamping flange 89 serves as a thrust bearing, and with the end of the hub of pulley 86 maintains the axial position of the shaft 85 and saw blade 13 with respect to the saw blade slot 16. At the lower part of the base 11 adjacent the saw blade 13, the side wall 75 is provided with a horizontal offset 96 and with an annular seat 97 terminated by a shoulder 98, forming a partially cylindrical chamber for the reception of the saw blade 13. This chamber is partially closed by a cast metal plate 99 of the shape shown in Fig. 4, which is provided with a pair of apertures for receiving the screw bolts 100 which pass through the plate and are threaded into the seat flange 97 to secure the plate 99 in place.

The rear wall 74 is also preferably provided with an integral tubular extension 101, which in this case is substantially rectangular in vertical section, and is provided with an inner conduit, which leads up into the space bounded by the walls 75, plate 99, and offset 96 and extends tangentially with respect to the periphery of the saw blade 13 and in the direction in which the sawdust is thrown off by the blade. The sawdust may thus be discharged out of the tubular conduit 101 to the rear of the machine.

The table 12 is preferably supported for tilting movement with respect to the saw blade 13 so that cuts may be made at any angle to the surface of the wood which is held upon the table 12. For this purpose I prefer to provide a pair of partially cylindrical trunnions 102, 103, one located at the rear, and the other at the front of the table or the base 11. Each of these trunnions may be identical in construction, and each one consists of a cast metal member having a partially cylindrical surface 104 bordered at each of its ends with a vertically extending reinforcing flange 105, 106.

The reinforcing flanges 105, 106 also project radially at 107, 108, and are adapted to act as guides to maintain the associated bearing member in proper position. Each of the trunnions 102, 103 is provided with a pair of laterally projecting attaching flanges 109, 110, each flange having an aperture 111 for passing the screw bolts 112 which are threaded into the threaded bores 113 located in the bottom of the table 12. Suitable washers 114 and lock washers 115 are used to assure the permanent securement of these parts.

The partially cylindrical parts 104 of the trunnions 102, 103 are provided with peripherally extending slots 116, through which extend the screw bolts 117. Each of the screw bolts 117 carries a slider 118, comprising a substantially rectangular metal member having an aperture for the screw bolt 117 and having a reduced rectangular portion 119 of suitable size to slide in the slot 116. The screw bolts 117 pass through the complementary bearing members 120, 121, into which they are threaded and secured by means of a lock nut 122.

The bearing members 120, 121 are preferably supported upon the elevator, indicated in its entirety by the numeral 123. This elevator may consist of a cast metal member having an upper transverse beam 124, reinforced by a horizontally extending flange 125. At each end the beam 124 is provided with a vertically extending socket for receiving the upper end of a rack 126, 127, one side of each rack being provided with gear teeth 128. The racks 126, 127 may comprise cylindrical shafts, each of which is secured by a drive fit in a cylindrical bore 129 in the beam 124 and by means of a set screw 130 threaded into the beam and projecting into the bore 129 and engaging in a socket in the shaft 126, 127.

The base 11 is also preferably formed with a pair of integral enlargements 131, 132, one located near the front wall 76, and the other located adjacent the rear wall 74. These enlargements 131, 132 are provided with vertically extending cylindrical bores 133, each of which is adapted to slidably receive the lower cylindrical part of the racks 126, 127. The bores 133 communicate with the transverse horizontal bores 134 which extend through the walls 74, 76 and are adapted to pass the elevator shaft 135. The elevator shaft 135 is provided with a suitable crank 136 at its outer end, and with a pair of combined thrust bearings and pinions 137, 138. Each combined thrust bearing and pinion may consist of a substantially cylindrical metal member provided with an enlarged cylindrical portion 139 and an axial bore 140.

The enlarged cylindrical portion 139 has an annular thrust bearing surface 141 which engages outside of the respective walls 74, 76. Each of the walls is provided with a machined thrust bearing surface 142. The enlarged cylindrical part 139 is provided with a threaded bore for receiving the set screw 143 which secures the pinion to the shaft 135. The combined pinion and thrust bearing is provided with a tubular extension 144, which is formed with gear teeth 145 and which acts as a pinion, engaging the teeth 128 on the racks 126, 127.

As the combined thrust bearings and pinions 137, 138 extend into the bores 134 from opposite directions, they serve to fix the shaft against axial movement as well as to provide the shaft with pinions for actuating the racks 126, 127. The elevator 123 may thus be moved upward and downward by rotating the shaft 135 with crank 136, the racks 126, 127 sliding upward and downward in the guides 133.

The beam flange 125 is also provided with a vertically extending threaded bore 146 for receiving the stop screw bolt 147 which extends upward through this flange and engages the lower surface of the table 12. Stop screw 147 is secured in predetermined position by the lock nut 148, and is preferably located close to the center of rotation of the table 12 on the trunnions 102, 103.

The base 11 is also preferably formed with a suitably located lug 149 formed with a cylindrical socket 150 for receiving and seating the lower end of a helical coil spring 151. Coil spring 151 for the major portion of its length slidably engages on a stub shaft 152, which is fixedly mounted in the upper beam flange 125. Stub flange 152 has a reduced end 153 which is riveted over at its upper end to secure the shaft to the flange 125. Spring 151 is of sufficient strength to support the weight of the table and its associated parts, and tends to lift the table with respect to the base 11, thereby greatly reducing the effort necessary for elevating the table by means of the crank 136. The table may be secured at any predetermined elevation by means of a clamping member which is actuated by the knob 154, the details of which are shown in Fig. 9.

Referring to Fig. 9, the enlargement 131 is also provided with a transverse cylindrical bore 155 communicating with the bore 133 and adapted to receive the cylindrical clamping member 156. Bore 155 communicates with a smaller bore 157 which is threaded to receive the threaded end 158 of the rod 159 which carries the knob 154. The inner end of the cylindrical clamping member 156 preferably has a transverse partially cylindrical surface 160 which is complementary to the surface of the rack 127.

When the knob 154 is turned in a clockwise direction, the rod 159 is threaded home in the bore 157, and the hub end 161 of the knob 154 drives the clamping member 156 inward until this transverse cylindrical surface engages and clamps the rack 127. Thus the rack 127 and all of its associated parts may be secured at any predetermined elevation.

The table 12 may be tilted upon its trunnions 102, 103 to any predetermined position by means of the actuating crank 162 (Fig. 2). The details of construction of this actuating mechanism are shown in Fig. 7. The elevator 123 carries a depending integral flange 163 which supports a pair of legs 164, 165. The legs 164, 165 are provided with aligned transverse threaded bores for receiving the screw bolts 166, 167, which may be provided with conical tips for engagement in complementary sockets in a sleeve 168.

The sleeve 168 is adapted to rotatably support the screw shaft 169, which is provided with a pair of thrust bearing collars 170, 171, each of which has a set screw 172. The thrust bearing collars 170, 171 are secured at each end of the sleeve 168 and serve to prevent any longitudinal movement of the shaft 169 in the sleeve 168. The complete shaft 169 may, however, move pivotally with the sleeve 168 on the axis of the screw bolts 166, 167, as a slight amount of this movement is necessary as the table is tilted.

The end of the shaft opposite the crank 162 is provided with an enlarged screw thread 173 adapted to drive a follower 174, consisting of a sleeve having a complementary threaded bore 175. The follower 174 is pivotally mounted upon a U-shaped bracket 176, the yoke 177 of which is secured to the lower side of the table 12 by the screw bolts 178, which pass through the yoke and are threaded into the bottom of the table.

The two legs 179 of the U-shaped member 176 are provided with threaded bores 180, each of which has a threaded screw bolt 181 with a lock nut 182. The ends of the screw bolts 181 are made substantially conical and engage in complementary apertures 183, 183' formed in the sleeve or follower 174. The screw 173, being an irreversible mechanism, no clamping or securing device is necessary to hold the table in any predetermined position other than the assembly comprising the shaft 169 and its associated parts. When the table is tilted by means of this mechanism, it is merely necessary to actuate the crank 162 until the table reaches the angle desired. The table tilts on an axis which is substantially at the surface of the table 12 by virtue of the fact that the curvature of the trunnions 102, 103 is made with respect to a point located in the plane of the top of the table. The lower end of each of the bolts 117 is threaded into an aperture 184 and secured with a lock nut 185 so as to be fixedly secured to the bearings 120 or 121. These bearings are formed with complementary partially cylindrical surfaces 186, but comprising a lesser portion of a periphery of the cylinder so that they have a limited amount of rotative movement on the trunnions 102, 103.

The saw is preferably provided with a guard 187 and a splitter 188, as shown in Fig. 3. As the guard and splitter should always remain in the same position with respect to the saw blade 13, they are fixedly secured to the elevator which carries the saw blade shaft. The rear table bearing 121 may be provided with an integral extension 189, having a flat upper surface 190 and a plurality of depending reinforcing flanges 191 for providing a support for the splitter.

The extension 189 may be provided with a pair of threaded apertures for receiving a pair of screw bolts 192, each of which passes through an aperture in the foot flange 193 of the splitter 188. Splitter 188 comprises an upwardly extending sheet metal strip of sufficient width with relation to the set of the teeth of the saw blade 13 so as to assure the maintenance of the sawed portions of lumber in spaced relation to each other at the saw cut so that they will not pinch the saw. In fact, the splitter may be made slightly wider than the set of the saw teeth so as to tend to spread the sawed portions and assist the free rotation of the saw blade.

The splitter may support the guard 187 by means of a screw bolt 194, which passes through a pair of sheet metal arms 195, each of which has an aperture for the screw bolt 194, and each of which is arranged on one side of the splitter 188. A pair of nuts 196 lock the bolt 194 in place, and the arms 195 are adapted to move pivotally about the bolt 194. At the opposite end of the arms 195 they support the safety guard 187, which is materially thicker than the splitter 188. Therefore, the two arms 195 are provided with a pair of offset portions 197. The ends of the arms 195 are provided with aligned apertures for receiving the screw bolt 198 which passes through these arms and through aligned apertures 199 in the two side flanges 200 of the safety guard 187 and are secured by the lock nuts 201.

The safety guard 187 comprises a sheet metal member having a flat yoke 202 at the top supporting a pair of side flanges 200 which depend from the yoke 202 at each side and are located on the opposite sides of the saw blade 13. In order to permit the view of the saw in operation, the side flanges 200 may be formed with an upwardly extending slot 203 at the center of each flange, and in order that the guard may be lifted upwardly by the work piece of lumber, the forward edge 204 of each part of the flange is formed with a curved surface which may act as a cam to be cammed upward by the lumber in case the guard is not set at the proper position.

The miter gauge 205 is preferably supported upon a long steel bar 206 which is complementary in shape to the miter gauge slots 17, 18. The bar 206 also supports a pointer 207 which may consist of a sheet metal member having an attaching flange with an aperture for receiving a screw bolt for securing the pointer to the bar 206. The pointer extends upward from the bar at the periphery of the miter gauge 205 and parallel to the bar at its end where it is formed with a point just above the indicia 208.

The miter gauge comprises a semi-circular disc of metal which is formed with arcuate slot 209. The curvature of the slot and the curvature of the disc are formed with respect to a center which is preferably substantially in the plane of the upwardly extending machined surface 210 of the guide flange 211, which is carried substantially at the diameter of the disc.

Guide flange 211 is formed with an aperture for receiving a threaded screw bolt 212 which is provided with a wing nut 213 engaging a clamping member 214. The clamping member 214 is formed with a pair of partially cylindrical clamping parts 215, each of which engages a guide rod 216, 217. The miter gauge 205 is secured to the bar 206 by means of a screw bolt 218, which is threaded into a threaded bore in the bar 206 and which is provided with a knurled knob 219. The forward trunnion 103 is preferably provided with indicia and scale marks 220 for cooperating with a pointer 221 carried by the bearing 120.

Pointer 221 is provided with a slot 222 and may be secured to the bearing 120 by a clamping screw bolt 223, which is threaded into the body of the bearing 120. The elevator is also preferably provided with a laterally projecting lug 224 having a vertical bore for supporting a pointer 225, which consists of a small rod with a laterally turned end. The pointer 225 is clamped in the lug 224 by means of a threaded member 226. The adjacent wall of the base 11 is also preferably provided with indicia and scale marks 227, indicating the depth of cut of the saw into the lumber above the table at any predetermined elevation.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a wood working tool, the combination of a metal table provided with longitudinally extending slot, a rip fence extending substantially parallel to said slot, a guiding fixture carried by the rip fence and a guide bar carried by the table, and means carried by the lower side of the rip fence at a point spaced from the guide fixture for bridging the slot and preventing the rip fence from dropping into the slot as it progresses over the slot on the table, said means comprising a metal member of greater width than the rip fence mounted on the bottom of the rip fence and adapted to be slid from one side to the other of the rip fence, to prevent interference between the bridging means and the work, and said rip fence having a guide aperture for slidably supporting said metal member.

2. In a wood working tool, the combination of a metal table provided with a longitudinally extending slot, a rip fence extending substantially parallel to said slot, a guiding fixture carried by the rip fence and a guide bar carried by the table, and means carried by the lower side of the rip fence at a point spaced from the guide fixture for bridging the slot and preventing the rip fence from dropping into the slot as it progresses over the slot on the table, said means comprising a substantially U-shaped member mounted in a complementary groove formed in the rip fence, resilient means for drawing said U-shaped member into said groove, said U-shaped member having a slot engaging a pin carried by said rip fence whereby the U-shaped member may be slid from one side to the other of the rip fence.

3. In a wood working tool, the combination of a table formed with an upper plane surface, said table having a plurality of forwardly projecting lugs at one edge, a guide bar permanently secured to said lugs and provided with indicia, a fixture having guide surfaces complementary in shape to said bar slidably mounted on said bar, and a rip fence extending at right angles to said bar and carried by said fixture above said table, an extension for said table fixedly secured at one side of said table and provided with a similar guide bar, said guide bars having complementary aligning formations for determining the position of said guide bars with respect to each other whereby the fixture may slide smoothly from one guide bar to the other.

4. In a wood working tool, the combination of a table formed with an upper plane surface, said table having a plurality of forwardly projecting lugs at one edge, a guide bar permanently secured to said lugs and provided with indicia, a fixture having guide surfaces complementary in shape to said bar, slidably mounted on said bar, and a rip fence extending at right angles to said bar and carried by said fixture above said table, said fixture having a shaft rotatably mounted thereon, a drive wheel carried by said shaft having a non-slip surface member engaging said bar, and manual means for rotating said shaft, said fixture having a counterbore surrounding said shaft, and spring means in said counterbore constantly urging said drive wheel into engagement with said bar.

5. In a wood working tool, the combination of a table with a guide bar, sliding means slidably mounted on said guide bar, a fence carried by said guide means, said table having grooves extending substantially parallel to said fence for slidably mounting attachments on said table, said fence being narrower in width than said grooves, said fence having a transverse slot in its lower face, and a bridging member longer than the width of said grooves, said bridging member being mounted for sliding movement transversely on said fence to bridge said grooves.

6. In a wood working tool, the combination of a table with a guide bar, sliding means slidably mounted on said guide bar, a fence carried by said guide means, said table having grooves extending substantially parallel to said fence for slidably mounting attachments on said table, said fence being narrower in width than the width of said grooves, said fence having a transverse slot in its lower face, and a bridging member longer than the width of said grooves, said bridging member being mounted for sliding movement transversely on said fence to bridge said grooves, and comprising a metal member of substantially U shape, having a slot engaging a bolt carried by said fence.

7. In a wood working tool, the combination of a table with a guide bar, sliding means slidably mounted on said guide bar, a fence carried by said guide means, said table having grooves extending substantially parallel to said fence for slidably mounting attachments on said table, said fence being narrower in width than the width of said grooves, said fence having a transverse slot in its lower face, and a bridging member longer than the width of said grooves, said bridging member being mounted for sliding movement transversely on said fence to bridge said grooves and comprising a metal member of substantially U shape, having a slot engaging a bolt carried by said fence, said U shaped member also having laterally extending feet and said screw bolt having spring means engaging said bridging member to urge said bridging member into a slot in said fence.

8. In a wood working tool, the combination of a table with a guide bar, sliding means slidably mounted on said guide bar, a fence carried by said guide means, said table having grooves extending substantially parallel to said fence for slidably mounting attachments on said table, said fence being narrower in width than the width of said grooves, said fence having a transverse slot in its lower face, a bridging member longer than the width of said grooves, said bridging member being mounted for sliding movement transversely on said fence to bridge said grooves and comprising a metal member of substantially U shape, having a slot engaging a bolt carried by said fence, and friction means for securing said bridging member in any of a plurality of adjusted positions projecting laterally of said fence.

9. In a wood working tool, the combination of a table formed with an upper plane surface, said table having a plurality of forwardly projecting lugs at one edge, a guide bar permanently secured to said lugs and provided with indicia, a fixture having guide surfaces complementary in shape to said bar slidably mounted on said bar, a rip fence extending at right angles to said bar and carried by said fixture above said table, said fixture having a shaft rotatably mounted thereon, a drive wheel carried by said shaft and engaging said guide bar, said shaft being slidably mounted in said fixture, manual means for rotating said shaft, and common resilient means for drawing said drive wheel into engagement with said guide bar and for drawing the guide surfaces of said fixture into engagement with said guide bar to hold said fence at right angles to said guide bar.

10. In a wood working tool, the combination of a table formed with an upper plane surface, said table having a plurality of forwardly projecting lugs at one edge, a guide bar permanently secured to said lugs and provided with indicia, a fixture having guide surfaces complementary in shape to said bar slidably mounted on said bar, a rip fence extending at right angles to said bar and carried by said fixture above said table, said fixture having a shaft rotatably mounted thereon, a drive wheel carried by said shaft and engaging said guide bar, said shaft being slidably mounted in said fixture, manual means for rotating said shaft, and common resilient means for drawing said drive wheel into engagement with said guide bar and for drawing the guide surfaces of said fixture into engagement with said guide bar to hold said fence at right angles to said guide bar, said shaft extending diagonally upward with respect to said fence, and said drive wheel having a frusto-conical surface of non-slipping material engaging said guide bar.

THERON L. HEDGPETH.